(12) United States Patent
Schwartz

(10) Patent No.: US 11,373,010 B2
(45) Date of Patent: Jun. 28, 2022

(54) ASYMMETRICAL SYSTEM AND NETWORK ARCHITECTURE

(71) Applicant: Gerhard Schwartz, Frankfurt Hessen (DE)

(72) Inventor: Gerhard Schwartz, Frankfurt Hessen (DE)

(*) Notice: Subject to any disclaimer, the term of this patent is extended or adjusted under 35 U.S.C. 154(b) by 482 days.

(21) Appl. No.: 16/475,914

(22) PCT Filed: Jan. 4, 2017

(86) PCT No.: PCT/EP2017/050130
§ 371 (c)(1),
(2) Date: May 20, 2020

(87) PCT Pub. No.: WO2018/127278
PCT Pub. Date: Jul. 12, 2018

(65) Prior Publication Data
US 2020/0285776 A1    Sep. 10, 2020

(51) Int. Cl.
*G06F 21/71* (2013.01)
*G06F 11/36* (2006.01)
*H04L 9/40* (2022.01)
*G06F 21/76* (2013.01)

(52) U.S. Cl.
CPC .............. *G06F 21/71* (2013.01); *G06F 11/36* (2013.01); *H04L 63/0428* (2013.01); *H04L 63/08* (2013.01); *H04L 63/101* (2013.01); *H04L 63/145* (2013.01); *G06F 21/76* (2013.01); *H04L 2463/144* (2013.01)

(58) Field of Classification Search
CPC .......... G06F 21/71; G06F 11/36; G06F 21/76; G06F 2015/763; H04L 63/0428; H04L 63/08; H04L 63/101; H04L 63/145; H04L 2463/144; H04L 63/0853; H04L 63/14; H04L 63/107
See application file for complete search history.

(56) References Cited

U.S. PATENT DOCUMENTS

| | | | | |
|---|---|---|---|---|
| 5,883,956 A | * | 3/1999 | Le | .......... G06F 21/572 713/170 |
| 5,940,859 A | * | 8/1999 | Bistry | ................. G06F 9/30036 712/E9.032 |
| 6,792,523 B1 | * | 9/2004 | Glew | ...................... G06F 9/384 712/217 |

(Continued)

FOREIGN PATENT DOCUMENTS

| | | |
|---|---|---|
| JP | 2002111747 A | 4/2002 |
| JP | 2009038598 A | 2/2009 |
| JP | 2013179522 A | 9/2013 |

*Primary Examiner* — Aravind K Moorthy
(74) *Attorney, Agent, or Firm* — Smartpat PLC

(57) ABSTRACT

A novel system and network architecture unburdens the end users as a result of reduced complexity of the infrastructure used by said users. As a result of the omission of processors, operating systems and conventional software on the user side, the use of the IT is simplified and the infiltration of malware into the devices belonging to the end users is prevented. In addition, the new architecture makes it possible to set up secure and more efficient networks even with respect to IoT and Industry 4.0 as well as new business models and supports both the coexistence and the migration of the conventional technology to the new architecture.

15 Claims, 3 Drawing Sheets

(56) References Cited

U.S. PATENT DOCUMENTS

| | | | | |
|---|---|---|---|---|
| 8,706,081 B1* | 4/2014 | Paya | H04M 17/103 | 455/410 |
| 9,003,346 B1* | 4/2015 | Dutta | G06F 30/392 | 716/126 |
| 9,177,153 B1* | 11/2015 | Perrig | G06F 21/57 | |
| 9,202,059 B2* | 12/2015 | Bhansali | G06F 21/31 | |
| 9,530,007 B1* | 12/2016 | Allen | G06F 11/3688 | |
| 9,565,207 B1* | 2/2017 | Marr | H04L 9/3247 | |
| 9,779,248 B1* | 10/2017 | Gefflaut | H04L 9/3234 | |
| 10,177,934 B1* | 1/2019 | Marr | H04L 12/40032 | |
| 2004/0179017 A1* | 9/2004 | Martyn | G09G 5/14 | 345/592 |
| 2005/0172280 A1* | 8/2005 | Ziegler | G06F 21/56 | 717/174 |
| 2006/0021032 A1* | 1/2006 | Challener | G06F 21/80 | 726/22 |
| 2006/0053492 A1* | 3/2006 | Wallace | G06F 21/53 | 726/26 |
| 2007/0011724 A1* | 1/2007 | Gonzalez | G06F 21/34 | 713/184 |
| 2007/0186070 A1* | 8/2007 | Federa | G06F 12/1425 | 711/163 |
| 2008/0015808 A1* | 1/2008 | Wilson | G06F 21/51 | 702/123 |
| 2008/0126782 A1* | 5/2008 | Dayan | G06F 21/572 | 711/E12.008 |
| 2009/0204964 A1* | 8/2009 | Foley | G06F 21/53 | 718/1 |
| 2009/0205044 A1* | 8/2009 | Challener | G06F 21/552 | 726/22 |
| 2009/0222910 A1* | 9/2009 | Le Bihan | H04L 9/3273 | 726/19 |
| 2010/0223656 A1* | 9/2010 | Ray | H04L 9/3271 | 726/2 |
| 2011/0113231 A1* | 5/2011 | Kaminsky | G06F 21/575 | 713/2 |
| 2011/0239297 A1* | 9/2011 | Unagami | H04N 21/44236 | 726/22 |
| 2012/0226895 A1* | 9/2012 | Anderson | G06F 21/575 | 713/2 |
| 2013/0160084 A1* | 6/2013 | Hansen | G06F 21/53 | 726/4 |
| 2014/0082373 A1* | 3/2014 | Colnot | G06F 21/575 | 713/193 |
| 2014/0281088 A1* | 9/2014 | VanderLeest | G06F 9/4887 | 710/264 |
| 2014/0298026 A1* | 10/2014 | Isozaki | G06F 21/604 | 713/171 |
| 2015/0052616 A1* | 2/2015 | Hutchison | G06F 21/53 | 726/27 |
| 2015/0163056 A1* | 6/2015 | Nix | H04L 63/0435 | 380/46 |
| 2015/0324640 A1* | 11/2015 | Macciola | H04N 1/444 | 382/112 |
| 2016/0350534 A1* | 12/2016 | Poornachandran | H04L 9/3273 | |
| 2016/0366134 A1 | 12/2016 | Hughes et al. | | |
| 2016/0378633 A1* | 12/2016 | Sarangdhar | G06F 13/4282 | 714/5.11 |
| 2017/0010881 A1* | 1/2017 | Kawazu | G06F 8/65 | |
| 2017/0134223 A1* | 5/2017 | Ahmed | H04W 12/068 | |
| 2017/0134373 A1* | 5/2017 | Li | G06F 21/85 | |
| 2018/0004523 A1* | 1/2018 | Charney | G06F 9/3017 | |
| 2018/0054458 A1* | 2/2018 | Marek | H04L 63/1458 | |
| 2018/0144105 A1* | 5/2018 | Yao | G06F 21/10 | |

* cited by examiner

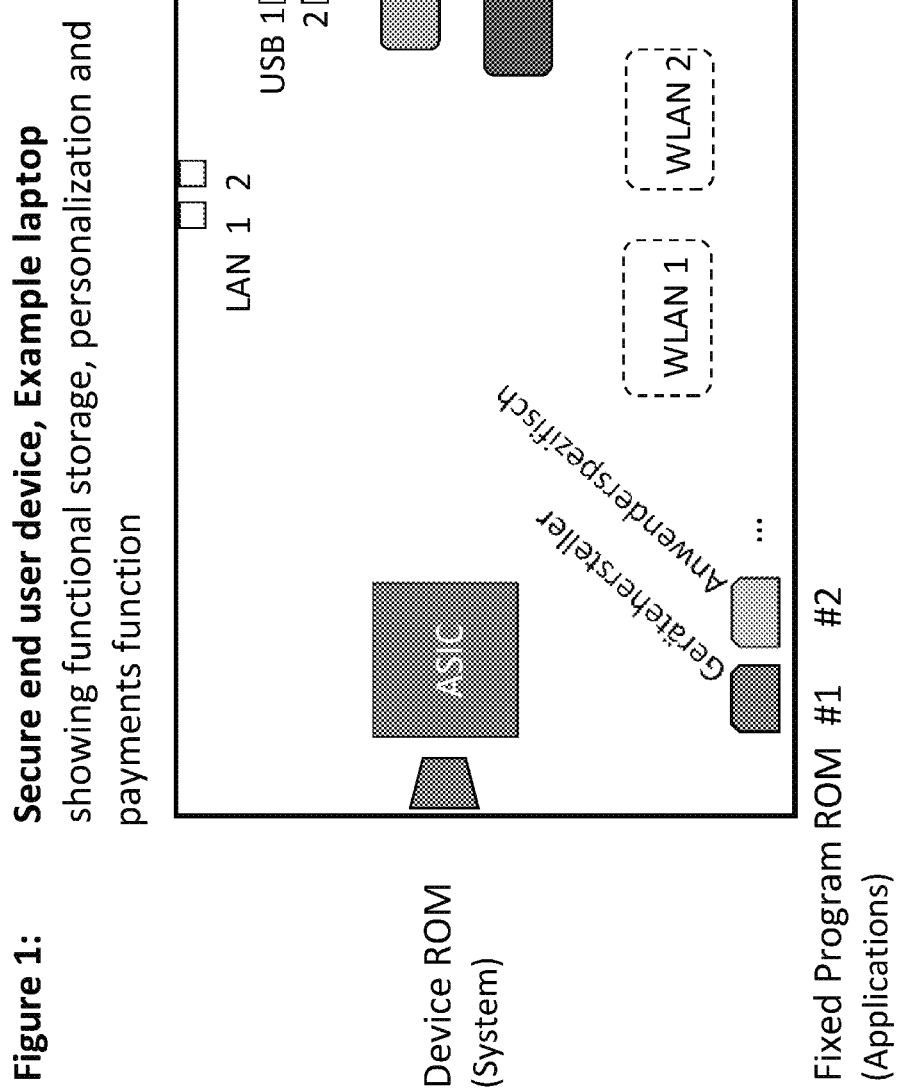

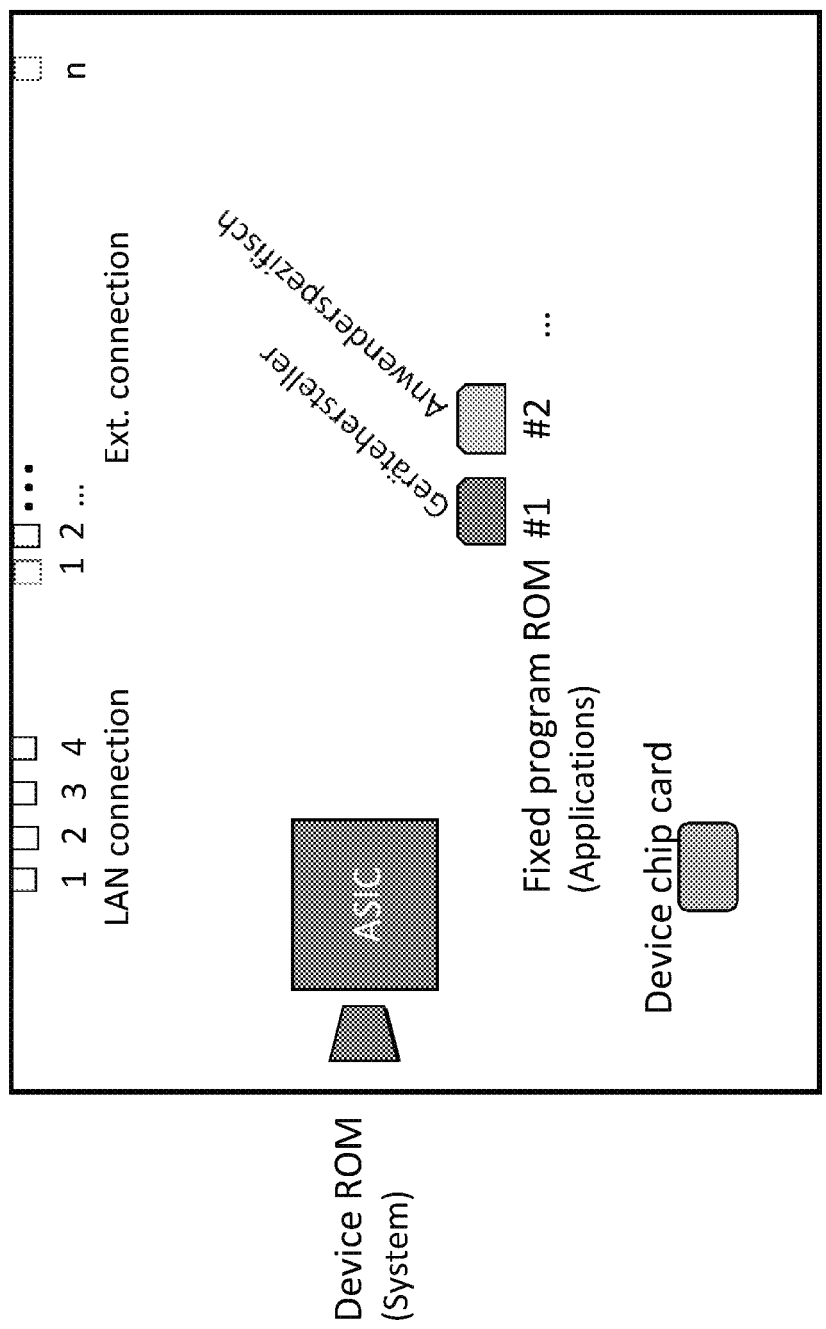
Figure 2: Secure endpoint for IoT and M2M
Example (form factor: 19" – module for device rack)
Showing functional storage and personalization

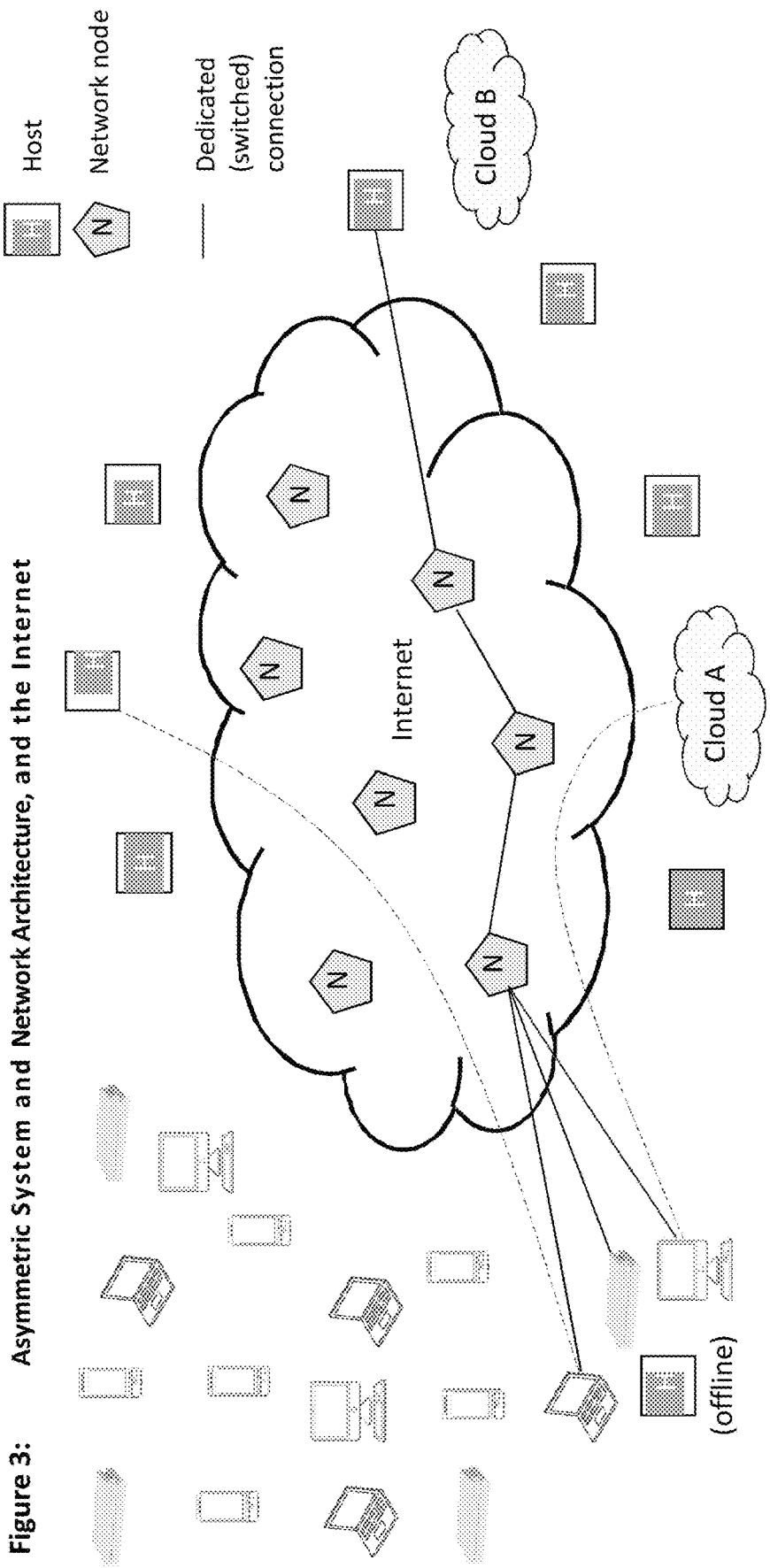
Figure 3: Asymmetric System and Network Architecture, and the Internet

ASYMMETRICAL SYSTEM AND NETWORK ARCHITECTURE

TECHNICAL FIELD

The disclosure relates to an asymmetric system and network architecture with tamper-resistant secure terminals.

BACKGROUND

Today's networks for IT communication are usually based on the handling of message packets according to the TCP/IP standard and thus require symmetric protocol stacks between the participating systems.

This leads to a functional symmetry that is mostly mapped in software, leading to relatively high complexity and many possibilities for errors and weaknesses in relation to IT security, especially on the end user side. Frequent changes to the software used do complicate the overall situation.

Many end users are often unable to fully understand the complexity and to react appropriately to the various errors— there is a high demand for knowledgeable support which is often not provided for at a sufficient level. This in turn significantly affects the use of the applications.

Even more damaging than occasional failures and the resulting costs are serious IT security incidents that can lead to very high levels of damage and a significant loss of reputation. In some cases (for example, know-how drainage by industrial espionage or sabotage of production processes), the existence of the company in question may be threatened, and more serious effects are to be feared in critical infrastructure (for example in energy supply environments).

Even well-trained end users can detect security threats only to some degree, and are often powerless against targeted attacks, e.g. by savvy cybercriminals or nation-state intelligence experts. This is especially true if the usual warnings regarding opening attached documents or clicking links do not work, because the given work processes do require exactly such actions.

The topics "Industry 4.0" and "Internet of Things" lead to further problems with regard to IT security, in particular due to the high number of different "things" getting connected. For cost reasons these things tend to have limited internal processing capabilities which often prevents the implementation of stronger security measures. Another limiting factor is the largely missing human control on the activities of such "things".

Historically, the evolution of the Internet has focused on communication between a limited number of well-intentioned, trusting and cooperating user groups. There is a lack of appropriate procedures to reliably manage and secure the diverse and complex communication processes in a global, highly heterogeneous and de facto untrusted environment.

Central IT infrastructure (traditional or cloud-based) today is very often implemented with standard technology derived from end user devices. This requires only relatively little investments initially, but involves considerable risks from the operational aspects and especially from the IT security perspective. Considering this, the total cost of running IT infrastructures is rather expensive.

SUMMARY

The subject of the disclosure is an Asymmetric System and Network Architecture for the construction and operation of electronic communication networks which offer higher operational reliability and better protection against spying and manipulation. In addition, through the use of this architecture, complexity is greatly reduced. This applies in particular to the end user equipment area, so there is also higher reliability, higher user acceptance and lower operating cost to be expected. End users get largely relieved from the responsibility of protecting the endpoint from malicious software—clicking on infected links or attachments will not result in permanent adverse effects.

An essential feature of the Asymmetric System and Network Architecture is the functional asymmetry due to the extensive relocation of various functions from end user devices to protected central nodes ("hosts") that can also be replicated, possibly multiple times, in order to improve operational resiliency.

On the other hand, in this architecture the end user devices or endpoints within the network are functionally limited. They contain only as much functionality as required for their operation as a browser terminal or as a concentrator/converter in conjunction with some appropriate central applications. In addition, in the case of person-operated end devices, simple standardized local application programs such as e.g. such for word processing, spreadsheets, image editing, presentation creation, address and phonebook registers, central password management, e-mail, clock and calendar, chat/social networking, emergency calls, audio/video—application, navigation (for mobile devices) and similar purposes can be implemented.

The endpoints of the network are usually used to connect devices, either secure end user devices for human use or secure endpoint devices for the unattended operation of technical equipment on the "Internet of Things" (IoT). Mixed forms and additional functions are possible, e.g. specific combined routing devices with WLAN function, DECT telephony and ZigBee interface for devices used in home automation.

The functions and applications of the secure end user devices or secure end points are hardcoded in read-only memories and cannot be altered remotely e.g. by downloading content (such as patches, apps, or plug-ins) or firmware updates. Thus, secure end user devices and secure endpoints as described in the Asymmetric System and Network Architecture are protected against online attacks by malicious software. Of course, data content can be transferred freely.

For functional changes and extensions to be made on said devices, local replacement of read-only memory components need to be performed.

Protective measures against manipulation and unauthorized replacement of such memory components are taken, e.g. by mounting those inside the devices or by sealing the slots for those components.

In addition, the insertion of new read-only memory components is automatically detected and logged, and is also displayed on the device.

The network architecture provides for the use of several, possibly also different communication paths (e.g. wired, wireless or optical fiber) between the endpoints and the network and/or hosting infrastructure. By means of the redundancy thus achieved, the architecture allows for continuous operation even in case of failure of communication paths and nodes, as well as supporting different operational characteristics.

In addition, the versatile design described above also allows easy migration to new operating modes or protocols and, if necessary, the simple switch back to the previous state ("fallback capability").

In addition to standard TCP/IP communication, the architecture optionally or alternatively allows for point-to-point or multipoint connection between the endpoint devices and network elements or hosts, for example to set up a dedicated control and message channel parallel to the user data traffic or to provide connections with short propagation delay or special security characteristics.

By means of special network elements is also possible to select transmission channels within the available connection paths (multiplexing) or to switch temporary or dedicated connections. From the application point of view there can be significant benefits (e.g., lower latency or better data security) versus packet switching via TCP/IP. Such measures can also avoid "Distributed Denial of Service (DDoS)" attacks on the "Domain Name System (DNS)".

If allowed by the configuration, the redirection of an end device connection to another host is supported.

Depending on their design, end devices can have multiple host connections and can work with data in different areas (for example, screen windows) and can also transfer data between those areas (e.g. via "copy and paste").

The host/portal function is preferably held on a separate computer in a secured environment. It provides access to higher-level IT systems such as ERP or central accounting systems, messaging or reservation systems and the like, or the forwarding of traffic to cloud-based services.

In addition, the secure end user devices or secure endpoints can optionally also support the direct connection of local "offline hosts" which can provide additional functionality on site without connecting these computers directly to the Internet. The secure endpoints or end user terminals provide secure data exchange, but do isolate the offline host from direct external access.

The terminals or endpoints can be personalized by the use of appropriate tokens (e.g. chip cards) with user IDs, passwords, system- and application-specific encryption parameters, application-specific functional information/parameters and the like. These tokens can as well be used to store user data and to transfer that data to other secure devices.

Encryption procedures (preferably end-to-end, or just for certain parts of the network) are provided and supported by the architecture.

The secure end user devices and secure endpoints are controlled via hardware components such as ASIC's or imbedded controllers and related hard-coded instructions contained in ROM (read-only memory) devices that can only be exchanged locally as already described.

The secure end user devices and secure endpoints, and also the ROMs used to control them, each do contain individual identifiers and version information to monitor the used secure devices or endpoints and their currently deployed functionality.

In addition, the personalization or authentication/authorization via tokens such as chip cards or similar means, other variants such as biometric methods can be supported.

For other applications (such as the use of search engines, pure information services etc.) non-personalized (anonymous) operation can be supported, if allowed in the respective configuration.

Secure end user devices may support various usage modes such as mobile operation, they are usually multimedia enabled, can support messaging systems and may contain local user functions as described above. These may also be leveraged in online mode, e.g. to support displaying online data in local table structures.

The physical formats of the secure end user devices may vary due to the respective intended usage profiles, in addition to traditional desktop devices more form factors such as laptops, tablets and handheld devices as well as body-worn devices (e.g., "smart watches") are feasible. The protocols and data formats used are compatible across those form factors and are supported by the server-side software portal.

Secure end user devices and secure endpoints can be connected to peripherals such as e.g. printers, scanners, external data storage or multimedia devices by various means such as wireline, wireless or optical connections.

BRIEF DESCRIPTION OF THE DRAWINGS

FIG. 1 is a block diagram of a secure end user device.

FIG. 2 is a block diagram of a secure endpoint for IoT and M2M.

FIG. 3 is a block diagram of an asymmetric system and network architecture.

DETAILED DESCRIPTION

As a typical example of a secure end user device, FIG. 1 shows a typical portable user device ("laptop") containing no conventional general purpose microprocessor and no operating system such as Windows or Linux. The functions of such devices are implemented via hardware such as imbedded processors, application specific circuits (ASICs) and fixed programs held in read-only memories (ROMs).

Changing the hardware-based device functions ("Updating") is only possible through local intervention and may require the breaking of a seal. The insertion of a new ROM requires a signature verification and is detected within and displayed at the device and can be signaled to one or more portals and/or network nodes if necessary.

Typically, a secure end user device or secure endpoint will contain, in addition to a device ROM controlling the communication with the portal and the network nodes, further ROM-based programs which may be supplied by the device vendor, the respective user organization or by certified third-party product vendors or service providers.

The form factors and technical interfaces of device ROM's and application ROM's can be different and may also differ from memory cards commonly used today, in order to prevent handling errors and to reduce the risk of local attacks.

The form factor of the token (the example of a personal chip card is shown here) should also be designed differently from the usual bank card format—e.g., a stick- or key-shaped token could be used.

The token may also store user data, e.g. to allow the transfer of documents to other secure end user devices without having to resort to potentially unsecure cloud services.

In addition, the token may also contain signatures, passwords and other parameters for authentication and encryption of data.

Via secure end user devices or secure endpoints, payment functions can also be performed. The illustration in FIG. 1 shows an example of a bank card slot in which debit or credit cards (typically equipped with a chip) can be introduced.

Communication to secure end user devices and secure endpoints is typically via LAN or WLAN. Two connections for each of these are shown in FIG. 1, which may be used in a redundant mode of operation. In addition, two USB ports are shown for connecting peripherals. This is just an example, there can be more ports and possibly other types of connections (e.g. Bluetooth).

Although the use of a Trusted Platform Module (TPM) could be possible, this tends to be seen as problematic by some experts and offers little added value in this environment. The same applies to the Intel Active Management Technology, which raises security concerns because of the integrated management engine which could be abused as "backdoor" for external attacks.

Compared to today's prevailing technology, secure devices as defined by the Asymmetric System and Network Architecture are far less complex due to their internal structure and functionality, and do provide higher operational reliability. Defective or lost devices can easily be disabled via adjacent network nodes or the associated portal.

System management is much simpler and moreover, is an integral part of the protocols between the portal, the network nodes and the secure devices. Separate device management functions are typically not required.

Within this architecture, secure end user devices utilized by humans are functionally equivalent to and can be operated jointly with secure endpoint devices connecting to machines, sensors and other gear utilizing communication in industrial environments (Machine-to-Machine, M2M) and the "Internet of Things" (IoT), including application areas such as home automation and connected cars.

Secure endpoint devices can be designed specifically for respective tasks e.g. as a simple adapter for connecting a meteorological measuring station, or as a larger unit to be deployed e. g. in conjunction with industrial plants or large machines, serving a significant number of sensors, actuators and control devices. Such specific designs can also be integrated into vehicles, home automation systems and other IoT-related products and environments.

Secure endpoint devices can also contain additional functions serving connected equipment (for example sensors, control devices, switches, lights, etc.) where these functions cannot be implemented in said equipment in an economically viable way. Such functions may comprise e.g. of application-specific customizations or encryption and other security features. Secure endpoints can be "personalized" (i.e. configured) by smart cards or similar means, in order to support the operations of the connected equipment.

The "things" (i.e. equipment) connected to secure endpoint devices hence do not require general purpose microprocessors and own operating system, such as Linux, and do not need to support TCP/IP or other Internet protocols. Consequently, such equipment has lower production and support cost and is not vulnerable to malicious software, greatly reducing the attack surface within IoT/Industry 4.0 environments.

This also reduces the risk of attacks via "botnets" (groups of devices hijacked via malware) that do affect users of conventional networks.

FIG. 2 shows an example of a secure endpoint device designed for machine-to-machine (M2M) communication within IoT and Industry 4.0 application environments.

For critical applications, such secure endpoints will often be operated in redundant setups. Therefore, the figure shows two such devices designed to operate within industrial 19"-racks. The protocols for secure devices and endpoints do support redundant configurations and automatic switchover in failure cases.

The components used for secure endpoints are largely identical to those for secure end user devices. However they are differences in their mode of operation, and thus also some differences in the respective ROM programs.

For larger tasks such as the control of a production cell within an automobile plant, more and possibly also different external device connections will be required, such as for various industrial fieldbus systems like Profibus or Modbus. Such features can either be integrated into the secure endpoint devices, or be covered by connected automation devices like programmable controllers.

FIG. 2 shows a secure endpoint with four LAN ports, for example to serve two ports each for redundant access to the external network and to a separate internal production network.

The internal production network may also have a local ("Offline") host computer connected to it, which cannot be accessed from the external network. That local offline host would communicate with other hosts or secure end user devices or secure endpoints in the external network via an offline host coupling function within the secure endpoint it is connected to. That secure endpoint acts as a gateway, i.e. it securely transfers data between the entities involved and is functionally seen as a secure end user device both from the offline host and from the external network.

FIG. 2 does not show any internal WLAN connections as those would be less practicable for a 19" rack within a metallic equipment cabinet. Such WLAN connections would most likely be realized via external WLAN devices.

Likewise, no bank card is shown here, as any payment functions in such an environment are likely to be realized in another way.

Secure endpoint devices are controlled via one or more ASICs/imbedded processors and fixed programs permanently stored in ROM components.

The ASIC shown in FIG. 2 is functionally comparable to the component shown in FIG. 1, the functions for screen and keyboard control can for the used to drive an external console device not shown here. It might connect via a redundant console bus pair to a number of secure endpoint devices within one or more device cabinets.

Similar as with secure end user devices, the various parameters and codes used within the secure endpoint devices are held in a token such as the chip card shown here.

In addition to the portal function and secure end user device and secure endpoint functions described previously, the Asymmetric System and Network Architecture also contains network elements (nodes), some of them providing essential control functions.

These are common router functions to handle the standard packet—oriented TCP/IP traffic, but in addition also the control of special connecting elements, multiplexers and the like to provide temporary or permanent communication channels (wired/wireless/optical fiber).

These functions may also be combined in a network node e.g. for using multi-protocol label switching (MPLS) and other advanced networking functions.

This also allows to create dedicated connections to support certain criteria such as a high level of privacy or certain latency requirements. These dedicated connections are typically either set permanently or created temporarily by the network, following e.g. a connection request via an auxiliary channel.

Portals and network elements within the described Asymmetric System and Network Architecture may leverage appropriate precautions against external attacks, e.g. by using an operating system which features very robust main memory management, thus preventing the overwriting of other memory areas ("Buffer Overflow Attacks").

Further IT security can be derived in the area of portals and network elements by the use of secure semiconductor technology not involving so-called backdoors, speculative processing, physical weaknesses and other potential vulnerabilities.

FIG. 3 shows an example of an implementation of the Asymmetric System and Network Architecture, showing coexistence with conventional Internet technology. Hosts and network nodes can communicate both by means of conventional packet switching and over other connections or channels with each other and with secure end user devices and secure endpoints. Multi-Protocol Label Switching (MPLS) is just one method that can be deployed.

As an application example, FIG. 3 shows in the bottom left a small user group with two secure end user devices (one in desktop and laptop format each), and a secure endpoint device for M2M communication.

These devices use a connection switched via hardware or software to the next network node, and communicate via further switched connections and network nodes with a remote host. A local ("offline") host is connected via the secure endpoint and can be accessed locally, but is not visible from the network. Data traffic with local devices and remote sites is performed under control of the offline host via the coupling function within the secure endpoint device.

In addition, the secure end user devices may communicate via conventional packet switching or via switched connections with other partners, e.g. services provided by other external hosts or cloud-based offerings.

The example shown could represent a production site which uses a local host for production control and also communicates with another remote host in the corporate headquarters. The local host is not visible from the network ("offline"). Remote maintenance operations (also for machines and other production equipment) can routed via the secure endpoint and can be initiated and performed under control of the offline host.

To ensure high availability, various redundancies on host, network and device level are possible and are supported by the protocols of the Asymmetric System and Network Architecture. For the purpose of better clarity, such redundancies are not shown in FIG. 3.

Secure end user devices and secure endpoints do support both switched connections (via means of hardware or software) as well as conventional packet switching on the Internet and thus enable a soft migration.

An important requirement for the operation of secure end user devices and secure endpoints within the Asymmetric System and Network Architecture is the use of an appropriately designed server-side software portal, providing protocols and interfaces that work in conjunction with the hardware-based controls and functions within the secure end user devices and secure endpoints described in this architecture.

The invention claimed is:

1. An asymmetric system and network architecture, comprising:
    tamper-resistant secure terminals which provide fixed programmed functions that cannot be changed from remote locations by downloading software or firmware updates,
    wherein the fixed programmed functions of the secure terminals are implemented in hardware by dedicated semiconductor elements and associated firmware,
    wherein the firmware is contained in read-only memory modules whose contents cannot be changed,
    wherein changes or enhancements to the fixed programmed functions do require physical replacement of the read-only memory modules,
    wherein replacement of the read-only memory modules is automatically registered and causes a warning to be displayed,
    wherein code and data contents are strictly separated within the secure terminals, and
    wherein an external download of executable code onto the secure terminals is not possible.

2. The asymmetric system and network architecture according to claim 1,
    further comprising, as a functional counterpart to the secure terminals, a corresponding software portal running on a host,
    wherein in combination the secure terminals and the software portal do replace functions of conventional browsers and provide an interface to the fixed programmed functions available in the secure terminals,
    wherein the software portal provides also a connection to central applications and offers program interfaces that enable software manufacturers to make their products available for use via the secure terminals,
    wherein, to enable a use of existing websites via the secure terminals, the software portal allows for a conversion of related page content, and
    wherein the software portal supports combined operation of the secure terminals via common protocols.

3. The asymmetric system and network architecture according to claim 2,
    wherein the secure terminals communicate via common protocols with the software portal,
    wherein the secure terminals are personalized by use of immutable device identifiers, license numbers and version identifiers of all firmware and fixed programs installed,
    wherein a secure identification of each current user is derived from a physical token,
    wherein the secure terminals employ encryption methods, each using different keys,
    wherein the secure terminals perform gateway and concentrator functions, for a connection of sensors or control elements to one of the secure terminals or for an operation of several of the secure terminals over a smaller number of common communication ports.

4. The asymmetric system and network architecture according to claim 3,
    wherein a dedicated activation of the secure terminals can be specified by the software portal in order to enable communication over a network,
    wherein the activation uses a unique device identifier.

5. The asymmetric system and network architecture according to claim 2,
    wherein, in a line or channel switching mode, temporary or permanent connections are controlled centrally from the network or the software portal.

6. The asymmetric system and network architecture according to claim 2,
    wherein control functions are performed by the software portal in conjunction with the secure terminals and their fixed programmed functions,
    wherein in addition to basic browser operation for using websites the software portals also supports the fixed programmed functions locally available in those secure terminals and additional application programs held centrally,
    wherein the software portal provides a connection to central or cloud-based applications and supports security functions including authentication of the secure terminals and their respective user as well as encryption of data traffic or individual data contents, and wherein routing and switching functions are performed in conjunction with the network to resolve failure or overload situations.

7. The asymmetric system and network architecture according to claim 1, wherein the secure terminals each comprise a permanently installed unchangeable device identifier, license numbers and version identifiers of the firmware and fixed programs used as well as a secure identification of a current user via a token, wherein the token identifies the user, is used in encryption of traffic by holding keys, and can be used to personalize device and application behavior, wherein the token also includes user-definable data areas, wherein the secure terminals can be used without tokens and thus anonymously, wherein transactions which require the user's token identification, and payment processes, also require the use of a related component for which a corresponding inset is provided and wherein mobile secure devices may also use wireless communication for payment transactions.

8. The asymmetric system and network architecture according to claim 1, wherein the secure terminals have two or more separate communication channels, for which, if necessary, different operating modes, protocols and transmission media can be used, wherein in addition to packet switching methods a use of temporary or permanent dedicated connections is also supported, wherein the secure terminals can use those two or more separate channels at the same time, wherein, for redundancy, it is possible to provide several identical or different channels per secure terminal for a particular purpose of use, wherein the architecture provides for switching during operation or the use of a cellular network connection to replace an overloaded or failed line-bound channel, and wherein the secure terminals can change a mode of operation by moving between packet switching and a dedicated channel mode.

9. The asymmetric system and network architecture according to claim 1, wherein the secure terminals support simultaneous operation of multiple communication streams to different targets, wherein a number of usable channels and a type of applications and functions that can be used can be controlled by appropriate personalization, wherein roles and rights of end users can be specified by central personalization of tokens, and wherein a host-side portal can ensure an intended use of the secure terminals by whitelisting.

10. The asymmetric system and network architecture according to claim 1, wherein the secure terminals are capable to interact with peripheral devices through standard interfaces.

11. The asymmetric system and network architecture according to claim 1, wherein a design for hybrid operation and for interoperability with public and private cloud systems uses portals and network elements.

12. The asymmetric system and network architecture according to claim 1, further comprising programming interfaces (API's) and centrally provided development and test facilities for software manufacturers and user organizations.

13. The asymmetric system and network architecture according to claim 1, wherein the tamper-resistant secure terminals comprise secure end user devices.

14. The asymmetric system and network architecture according to claim 1, wherein the tamper-resistant secure terminals comprise secure endpoints designed for machine-to-machine communication (M2M).

15. The asymmetric system and network architecture according to claim 1, wherein the tamper-resistant secure terminals comprise a mix of secure end user devices and secure endpoints designed for machine-to-machine communication (M2M).

* * * * *